United States Patent [19]

Holzman

[11] 4,211,469

[45] Jul. 8, 1980

[54] OPTICAL COUPLING DEVICE

[75] Inventor: Melvyn A. Holzman, Boulder, Colo.

[73] Assignee: The Deutsch Company Electronic Components Division, Banning, Calif.

[21] Appl. No.: 939,275

[22] Filed: Sep. 5, 1978

[51] Int. Cl.² .............................................. G02B 5/14
[52] U.S. Cl. .................. 350/96.16; 350/96.18; 350/96.20
[58] Field of Search .............. 350/96.16, 96.15, 96.17, 350/96.18, 96.20, 173

[56] References Cited

U.S. PATENT DOCUMENTS

| | | | |
|---|---|---|---|
| 3,870,396 | 3/1975 | Racki et al. | 350/96.16 |
| 3,870,398 | 3/1975 | Love | 350/96.16 |
| 3,874,779 | 4/1975 | Thiel | 350/96.16 |
| 3,902,786 | 9/1975 | Brown | 350/96.16 |
| 3,933,409 | 1/1976 | Kloots | 350/96.20 |
| 3,933,410 | 1/1976 | Milton | 350/96.16 |
| 3,936,141 | 2/1976 | Milton | 350/96.16 |
| 3,937,560 | 2/1976 | Milton | 350/96.16 |
| 3,977,764 | 8/1976 | d'Auria et al. | 350/96.16 |
| 4,011,005 | 3/1977 | Hawkes et al. | 350/96.15 |
| 4,012,149 | 3/1977 | Bouillie et al. | 350/96.15 X |
| 4,078,852 | 3/1978 | Lebduska | 350/96.18 |
| 4,102,559 | 7/1978 | Hunzinger | 350/96.18 |
| 4,119,362 | 10/1978 | Holzman | 350/96.18 |
| 4,130,345 | 12/1978 | Doellner | 350/96.15 X |

FOREIGN PATENT DOCUMENTS 469188 11/1974 Australia ............................ 350/96.15

OTHER PUBLICATIONS

Lynch, "Fiber Optic Connectors", *IBM Tech. Discl. Bulletin*, vol. 13, No. 2, Jul. 1970, pp. 533-534.
Bloem et al., "Fiber-Optic Coupler", *IBM Tech. Discl. Bulletin*, vol. 16, No. 1, Jun. 1973, pp. 146-147.
Ueno et al., "Data Highway Using Optical Fiber Cable", *Proceedings of Conference on Laser & EO Systems*, May 1976, pp. 78-79.
Kincaid, "Fiber Optic Data Distribution Systems . . .", *Applied Optics*, vol. 16, No. 9, Sep. 1977, pp. 2355-2356.

*Primary Examiner*—John K. Corbin
*Assistant Examiner*—John D. Lee
*Attorney, Agent, or Firm*—Gausewitz, Carr & Rothenberg

[57] ABSTRACT

This invention provides a light coupling device capable of selectively dividing a light signal and controlling its transmission from an emitter to receiving elements. The device includes a light-transmissive member with two pairs of opposite lens cavities for receiving light emitting and receiving devices such as optical fibers. A partial mirror is positioned between the cavities so that extensions of the axes of the cavities intersect at the partial mirror and make equal acute angles with the partial mirror. Part of the light from an emitting device in one cavity will be transmitted through the partial mirror to the opposite lens cavity while the remainder will be reflected to a third lens cavity. The fourth cavity receives none of the light. Light from each of the lens cavities will be reflected to a different lens cavity from that of any of the others, which enables various light coupling combinations to be selected. Three lens cavities may be provided in lieu of four lens cavities. In one version there is a light detector adjacent the partial mirror for monitoring the light signal.

13 Claims, 7 Drawing Figures

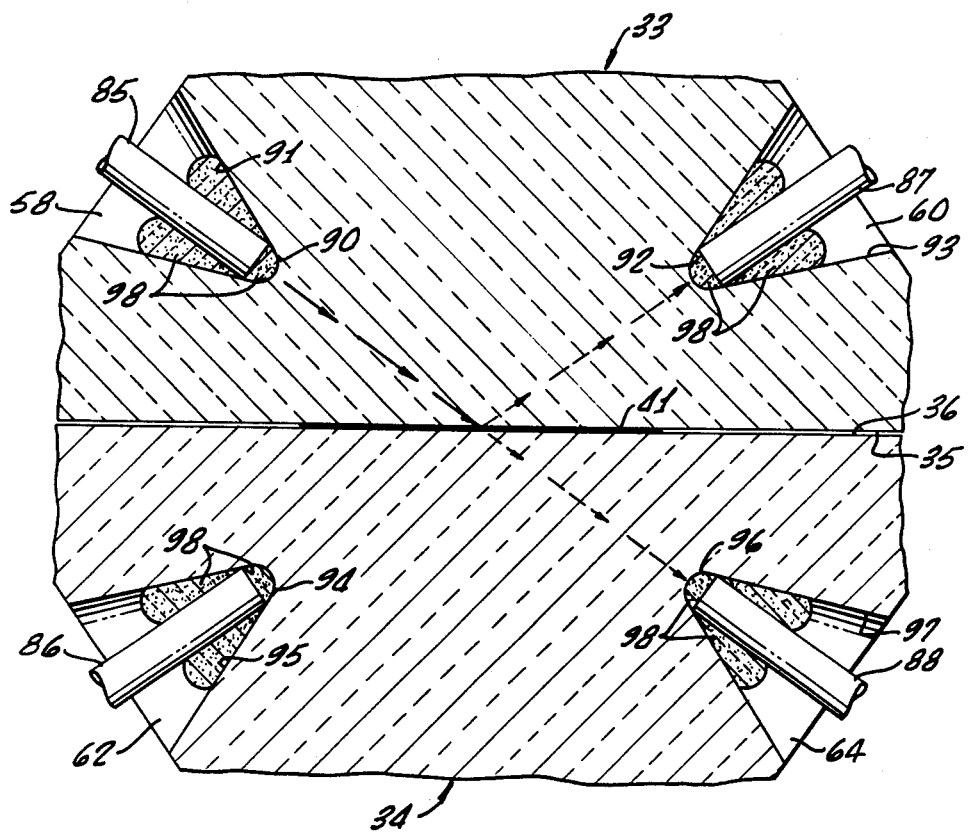

OPTICAL COUPLING DEVICE

BACKGROUND OF THE INVENTION

1. Field of the Invention

The invention relates to an optical coupling device, particularly to a device for dividing a light signal and for selectively transmitting a light signal to different receiving devices.

2. Description of the Prior Art

In optical systems utilizing optical fibers there has existed a need for an efficient means of dividing a light signal so that it may be transmitted to more than one receiving element. For example, it may be necessary to split a light signal transmitted by an optical fiber so that it is received and transmitted by two other optical fibers. Furthermore, it may be desirable to have one fiber receive more light than does the other. Also, it may be important to the system to allow light to be transmitted between one fiber and another in one direction while preventing transmission of the light between the fibers in the opposite direction. Another desirable capability for an optical system may be the use of a detector to monitor a light signal without interfering with its transmission between an emitter and a receiver and without unduly attenuating the light so transmitted. The prior art has produced no means to efficiently accomplish these various functions.

SUMMARY OF THE INVENTION

The present invention achieves the desired results noted above in a very efficient coupling arrangement. It may include a light-transmissive member with two pairs of oppositely arranged lens cavities with a partial mirror between the lens cavities. The axes of these cavities make the same angles with the partial mirror. A plane containing the axes of the cavities is perpendicular to the plane of the partial mirror. This arrangement causes light emitted from one lens cavity to be divided at the partial mirror, some of the light being reflected to an adjacent lens cavity and the remainder passing through the mirror to the opposite lens cavity. This very efficiently splits the light signal between the two cavities. The amount of reflectance of the partial mirror will govern the strength of the signal at the two lens cavities receiving it and may divide the light in any proportion. Light coming in the opposite direction will be split at the partial mirror, some passing through to the lens cavity that provided the emitting light previously. The reflected light, however, will be transmitted to an adjacent cavity different from the one receiving the reflected light originally. Thus, the combination of cavities receiving the light is not the same when the light travels in one direction as it is when light travels in the other.

The lens cavities preferably are formed by tapered entrances with inner lens surfaces made by surfaces of revolution of predetermined curvature, so that an optical fiber pressed therein will become axially aligned with the cavity through the engagement of the fiber end corner with the tapered cavity surface. An optical material of predetermined index of refraction occupies the space between the end surface of the fiber or other emitting or receiving device and the surface of the cavity. This arrangement will refract the light at the cavity lens surface and direct it through the light-transmissive member to the opposite cavity and for reflection by the partial mirror.

The light-transmissive member, which may be of plastic molded construction, typically is in two sections which meet at flat abutting surfaces. On one of these surfaces, the partial mirror is formed.

In some instances, one of the sections of the light-transmissive member may be eliminated and a light detector applied to the partial mirror. This enables the light detector to receive the light that passes through the mirror, while the reflected light goes to the adjacent lens cavity. The detector thereby can monitor the light signal.

BRIEF DESCRIPTION OF THE DRAWINGS

FIG. 6 is an enlarged fragmentary transverse sectional view of the lens assembly and associated optical fibers, illustrating the transmission of light through the optical coupling device; and FIG. 7 is a view similar to FIG. 6 but of a different embodiment of the invention that includes only two lens cavities and a light detector.

DESCRIPTION OF THE PREFERRED EMBODIMENT

Figure 1:
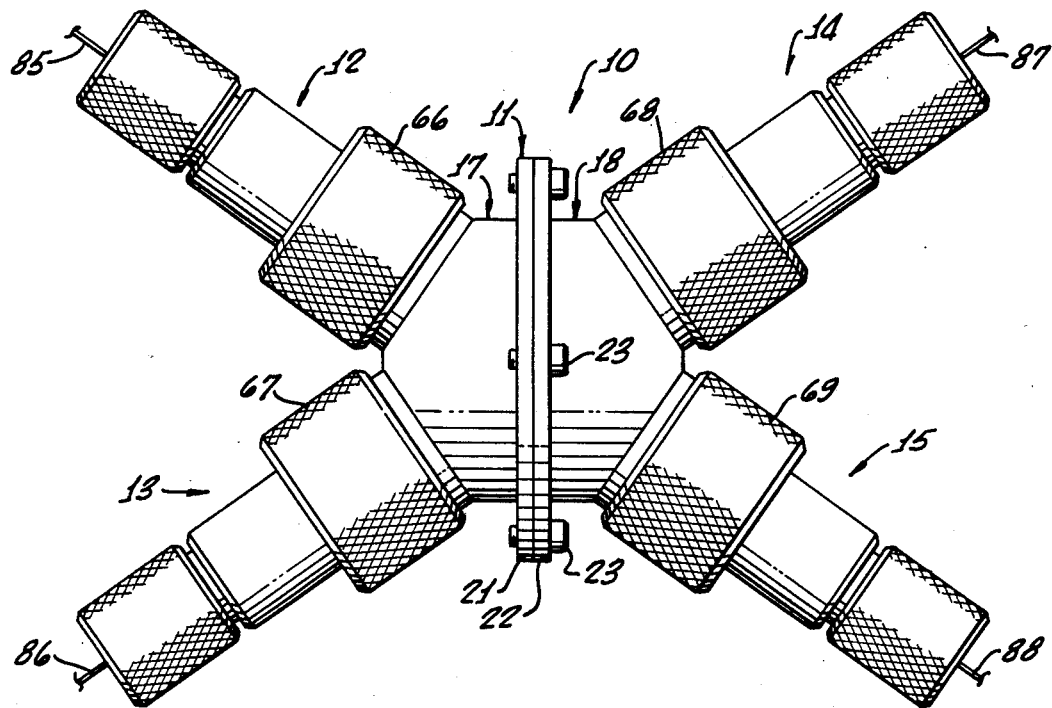
FIG. 1 is a side elevational view of an optical coupling device incorporating the present invention.
Figure 2:
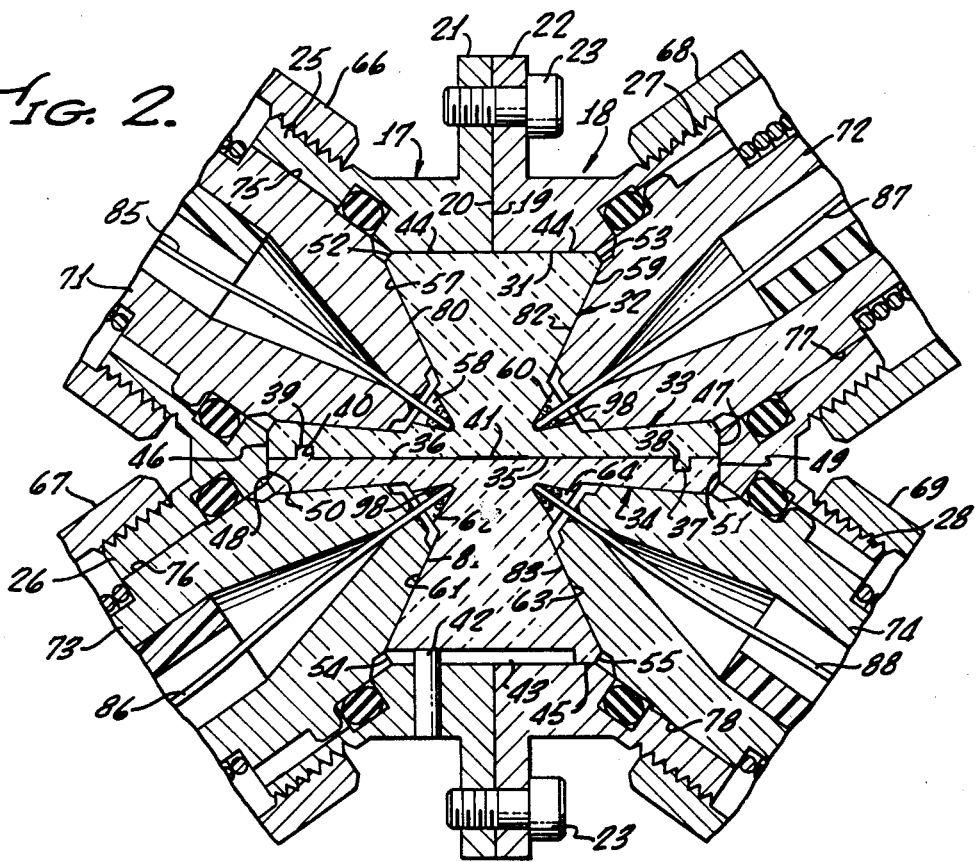
FIG. 2 is an enlarged fragmentary transverse sectional view of the coupling device of FIG. 1.
Figure 3:
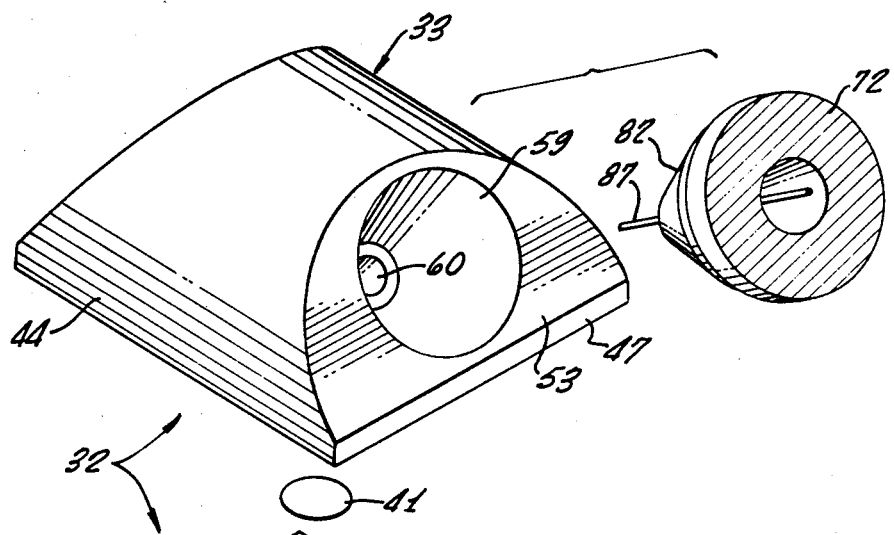
FIG. 3 is an exploded perspective view of the lens assembly of the coupling device.
Figure 3:
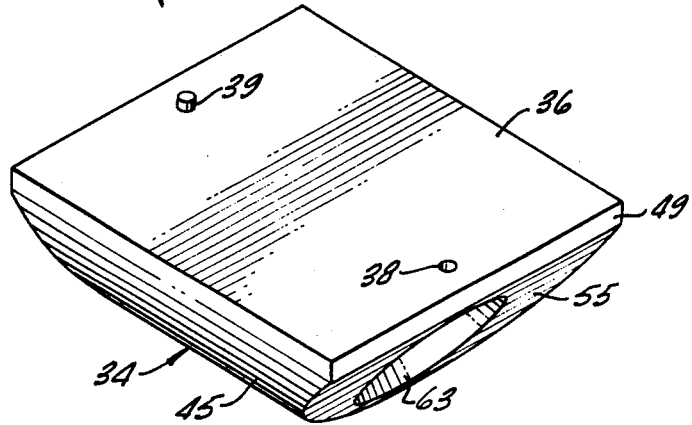
Figure 4:
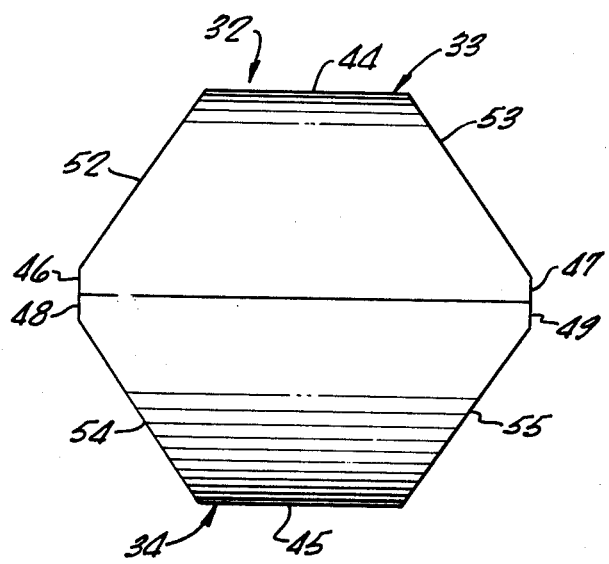
FIG. 4 is a side elevational view of the lens assembly.
Figure 5:
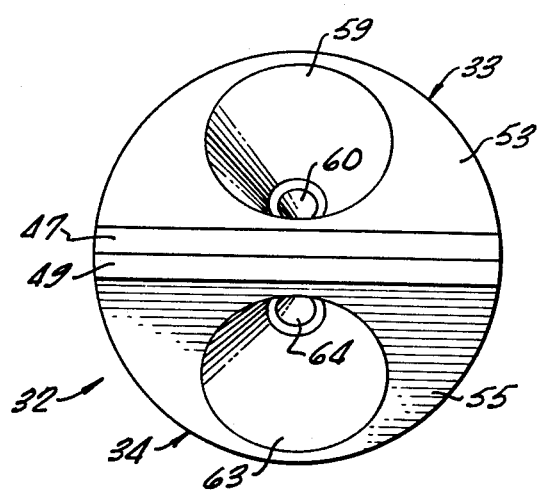
FIG. 5 is an end elevational view of the lens assembly.

As shown in FIGS. 1 and 2, the device 10 of this invention includes a receptacle 11 to which are connected four plugs 12, 13, 14, and 15. These plugs are of the type shown and described in patent application Ser. No. 874,558, filed Feb. 2, 1978, by Marc W. Malsby, John S. Doty, and Jayantil N. Patel for Connector for Optical Fibers.

As seen in FIG. 2, the receptacle 11 includes an outer shell of metal made of two sections 17 and 18. These shell sections include interengaging flat surfaces 19 and 20 and peripheral flanges 21 and 22. Screws 23 extend through the flanges 21, holding the shell sections 17 and 18 together with their surfaces 19 and 20 in abutment. The shell section 17 includes two externally threaded, outwardly projecting tubular portions 25 and 26 and similar tubular portions 27 and 28 are provided on the shell section 18. In the assembled shell, the tubular section 25 of the section 17 is opposite from the tubular section 28 of the mating section 18. Similarly, the tubular section 26 of section 17 is opposite from section 27 of shell section 18. Also, the angle between the axes of the tubular sections 25 and 26 is the same as the angle between the axes of the tubular sections 27 and 28.

The sections 17 and 18 collectively define a cylindrical opening 31 within which is a lens assembly 32 made up of two sections 33 and 34. These lens members are made of a transparent material of predetermined index of refraction, and may be formed of molded plastic. The lens sections 33 and 34 have flat inner surfaces 35 and 36, respectively, which are in abutment and may be bonded together. An integral short cylindrical pin 37 on the lens section 33 enters a complementary recess 38 in the lens section 34. Similarly, there is a pin 39 projecting from the flat surface 36 of the lens section 34 that fits within an opening 40 in the flat surface 35 of the lens section 33. These pins and openings align the two lens sections.

At the center portion of the lens assembly 32 is a reflector in the form of a plane partial mirror 41 which is applied to either the surface 35 or the surface 36. A pin 42 in the receptacle shell section 17 enters a keyway 43 in the lens member 34 which aligns the lens assembly 32 angularly with the receptacle shell. As a result, the partial mirror 41 is positioned in a plane that is perpendicular to a plane that contains the axes of the tubular portions 25, 26, 27, and 28 of the receptacle shell.

The peripheral surfaces 44 and 45 of the lens sections 32 and 33 are semicylindrical and collectively are complementary to the wall of the opening 31 in the receptacle 11 within which the lens assembly fits. The lens member 33 includes opposite flat side surfaces 46 and 47 with similar surfaces 48 and 49 on the opposite sides of the lens member 34. The surfaces 46 and 48 are in the same plane, forming continuations of each other and fit complementarily adjacent a receptacle surface 50. Similarly, the surfaces 47 and 49 are complementary to and adjacent the receptacle surface 51.

Flat surfaces 52 and 53 of the lens member 33 extend at an angle to interconnect the flat side surfaces 46 and 47, respectively, with the semicylindrical exterior surface 44. Comparable flat surfaces 54 and 55 of the lens member 34 connect the side surfaces 48 and 49, respectively, with the semicylindrical outer surface 45.

Each of the lens members includes two outwardly facing blind openings, all of which taper inwardly and are of the same size and proportions, and are formed by surfaces of revolution. In the lens member 33 one of the openings (at the left in FIG. 2) includes a frustoconical entrance portion 57 which connects to an inner cavity portion 58. The other opening in the lens member 33 includes a similar entrance 59 and an inner cavity 60. In the lens member 34 the opening shown in the lower lefthand portion of FIG. 2 includes a frustoconical entrance 61 connecting to an inner cavity 62. The other opening in the lens member 34 has a frustoconical entrance 63 and an inner cavity 64.

In the lens assembly, the entrance 57 and cavity 58 in the lens member 33 are axially aligned with and opposite from the entrance 63 and cavity 64 in the lens member 34. Also, the entrance 61 and cavity 62 of the lens member 34 are axially aligned with and opposite from the entrance 59 and cavity 60 in the lens member 33. The axes of all of these openings make equal angles with respect to the mating flat surfaces 35 and 36 and hence with respect to the partial mirror 41 of the lens members.

The openings in the lens assembly communicate and are axially aligned with the inner portions of the adjacent tubular sections 25, 26, 27, and 28 of the receptacle 11. Thus, the entrance 57 communicates with the interior of the tubular section 25, the entrance 59 connects with the tubular section 27, the entrance 61 connects to the interior of the tubular section 26, and the entrance 63 communicates with the interior of the tubular section 28.

The connector plugs 12, 13, 14, and 15 connect to the receptacle 11 by means of the exteriorly threaded tubular portions 25, 26, 27, and 28 of the receptacle. The coupling ring 66 of the plug 12 threads onto the tubular section 25, the coupling ring 67 of the plug 13 connects onto the tubular section 26, the coupling ring 68 of the plug 14 connects onto the tubular section 27, and the coupling ring 69 of the plug 15 threads onto the tubular section 28. The plugs 12, 13, 14, and 15 include front shells 71, 72, 73, and 74, respectively, which have cylindrical exterior surfaces 75, 76, 77, and 78 that fit into the tubular sections 25, 26, 27, and 28. At the forward ends of the plugs 12, 13, 14, and 15 the front shells include frustoconical surfaces 80, 81, 82 and 83 which are complementary to and pressed against the entrances 57, 59, 61, and 63, respectively, of the openings in the lens assembly. This aligns the plugs with the openings in the lens assembly. Carried by the plugs 12, 13, 14, and 15 are optical fibers 85, 86, 87, and 88, respectively, which extend through axial openings in the front shells, projecting beyond them into the inner cavities 58, 60, 62, and 64 of the lens assembly. The plugs bias the optical fibers axially so that their forward end corners bear against the tapered cavity surfaces of the lens assembly.

As best seen in the enlarged view of FIG. 6, the inner cavities 58, 60, 62, and 64 are of the type shown and described in U.S. Pat. No. 4,119,362. That is to say, the cavities include lens surfaces at their inner ends, which may be segments of a sphere of predetermined dimension. The cavity 58 includes an inner lens surface 90, outwardly of which is a tapered entrance surface 91. The inner end 92 of the cavity 60 forms a lens surface with a frustoconical entrance portion 93 outwardly of the lens 92. The cavity 62 has an inner lens surface 94, with a tapered entrance 95, a similar lens surface 96 and entrance 97 making up cavity 64. The lens surfaces of opposite cavities are at predetermined distances from each other and from the partial mirror 41. An optical material such as an optical fluid 98 of predetermined index of refraction occupies the space between the end surface of each of the optical fibers and the adjacent cavity surface. An excess of the fluid 98 is provided in each cavity to assure that the space beyond the fiber end is completely full. The excess is displaced around the fiber when it is pressed axially into the cavity.

By being pressed into the cavities by the plugs of the connector, the optical fibers become aligned with the axes of the cavities. This comes about because the engagement of the forward end corners of the fibers with the tapered cavity surfaces produces a centering effect.

As a result of this arrangement, there are two pairs of oppositely positioned fibers. The fiber 85 is axially aligned with and positioned oppositely from the fiber 88. The fiber 86 and the fiber 87 also are opposite from each other and axially aligned. This also positions the axes of the fibers at equal angles to the partial mirror 41. Extensions of the axes of the cavities 58, 60, 62, and 64 (which are their optical axes), and hence extensions of the axes of the fibers 85, 86, 87, and 88, intersect at the partial mirror 41. By virtue of the key 42 and keyway 43, the axes of the fibers 85, 86, 87, and 88 fall in a plane that is perpendicular to the plane of the partial mirror 41.

If, for example, the fiber 85 is a light-emitting fiber, the light from this fiber will be refracted at the lens surface 90 of the cavity 58 and transmitted through the lens member 33 to the partial mirror 41, as indicated by the arrows in FIG. 6. A portion of this light will be reflected by the mirror 41 and transmitted again through the member 33 to the lens surface 92 of the cavity 60, which is on the same side of the mirror as the cavity 58. The light transmitted to the cavity 60 is refracted at the lens surface 92 and transmitted through the optical material 98 to the fiber 87. The remainder of the light passes through the partial mirror 41 and continues on through the lens member 34 to the lens surface 96 of the cavity 64. There it is refracted and then enters the fiber 88. Thus, the light becomes divided so that one portion of it goes to the fiber 87 and another portion goes to the fiber 88. None of the light is transmitted to the fiber 86.

Attenuation of light in this arrangement is extremely small, with a very high coupling efficiency being realized at each of the fibers 87 and 88. The light may be divided into any proportion desired by varying the characteristics of the partial mirror 41. It may allow half of the light to go through, with the other half being reflected, or a much larger proportion may be either transmitted through the mirror or reflected by it.

The pattern of light transmission differs if either the fiber 87 or the fiber 88 is the emitting fiber. If the fiber 88 is the emitter, light from this fiber will both pass through the partial mirror 41 to be received by the fiber 85 and be reflected at the partial mirror 41 to be received by the fiber 86. Therefore, light traveling in the opposite direction in the fiber 88 will not enter the fiber 87, instead being transmitted to the fiber 86, even though when light is received by the fiber 88 it is also received by the fiber 87.

If the fiber 87 becomes the emitter, the fiber 88 then receives no light. With the fiber 87 as the emitter, a portion of the light is reflected at the partial mirror 41 so that it will be received by the fiber 85. The remainder of the light will continue in a straight path, through the partial mirror 41, to be received by the fiber 86 opposite from the fiber 87. Accordingly, various combinations of light transmission are possible, with different fibers being selectively permitted to receive light or to be prevented from receiving light. The partial mirror 41 reflects light from each lens cavity to another lens cavity different from the one receiving reflected light from any of the other lens cavities.

A light-emitting device, such as a light-emitting diode or laser diode, may be provided at one of the cavities in the lens member in lieu of an optical fiber. For example, the light-emitting device could substitute for the fiber 85, which would then provide a light signal that would be split at the partial mirror 41 to continue through the fibers 87 and 88. Also, a light detector may be located in any of the cavities instead of an optical fiber.

It is also possible to construct the device with only three cavities when light transmission will be only in one direction. Again, efficient splitting of the light signal takes place, which may reflect and transmit the light in selected proportions.

In the embodiment of FIG. 7 only one lens member is used, this being the lens member 33 in the example shown. Positioned adjacent to the partial mirror 41 is a light detector 100 which will receive the light that passes through the partial mirror. If the fiber 85 is the emitter, some of the light will be reflected at the partial mirror 41 and transmitted to the fiber 87, as in the previously described embodiment. The remainder of the light will go through the mirror 41 to be received by the detector 100. On the other hand, if the fiber 87 is the emitting fiber, the fiber 85 receives the reflected portion of the light, while the light that goes through the partial mirror 41 again is received by the detector 100. This allows the detector 100 to monitor the signal, while at the same time transmitting a portion of the signal from one fiber to the other. It may be preferred to transmit the major part of the signal, while allowing only a small portion of the light to go through the mirror. Thus, the mirror could reflect 90% of the light that impinges upon it, allowing the signal to be monitored by the detector 100 without substantial loss to the signal that continues from one fiber to the other.

The foregoing detailed description is to be clearly understood as given by way of illustration and example only, the spirit and scope of this invention being limited solely by the appended claims.

I claim :

1. a light coupling device comprising
   a light-transmissive member of predetermined index of refraction having at least three spaced lens cavities therein,
   each of said lens cavities having a smoothly rounded unpointed inner end portion and an inwardly tapered portion leading to said inner end portion,
   a first and a second of said lens cavities being opposite from each other,
   a quantity of optical material of predetermined index of refraction in each of said cavities
   a partial mirror in said light-transmissive member,
   said partial mirror being between said first of said lens cavities and said second of said lens cavities;
   the third of said lens cavities being on the same side of said partial mirror as said first of said lens cavities,
   the optical axes of said first of said lens cavities and said third of said lens cavities being at equal angles relative to said partial mirror,
   means for emitting light in said first of said lens cavities,
   and a means for receiving light in each of said second of said lens cavities and said third of said lens cavities.

2. A device as recited in claim 1 in which said means for emitting light is a cylindrical optical fiber having a substantially flat end face perpendicular to the axis thereof, the edge of said optical fiber between said end face and the circumferential surface thereof engaging said tapered portion of said first of said lens cavities for aligning said optical fiber therewith, said optical material entirely filling the space between said end face and the inner end portion of said first of said cavities.

3. A device as recited in claim 1 in which said means for receiving light in at least one of said second and said third of said lens cavities is a cylindrical optical fiber having a substantially flat end face perpendicular to the axis thereof, the edge of said optical fiber between said end face and the circumferential surface thereof engaging said tapered portion of the one of said cavities receiving the same for aligning said optical fiber therewith, said optical material entirely filling the space between said end face and the inner end portion of the one of said cavities receiving said optical fiber.

4. A device as recited in claim 1 in which said light-transmissive member is in two sections, each of said sections having a planar surface, said planar surfaces being in juxtaposition, said partial mirror being formed on one of said planar surfaces.

5. An optical coupling device comprising
   a light-transmissive member of predetermined index of refraction having a first and a second lens cavity therein, said lens cavities being spaced from each other,
   each of said first and second lens cavities being formed by a surface of revolution so as to define a tapered entrance and a smoothly rounded unpointed inner end portion, said first and second lens cavities being opposite from each other with their axes in alignment, a partial plane mirror interposed between said first and said second cavities at an acute angle to an extension of said axes, said light-transmissive member having a third lens cavity therein spaced from said first and said second lens cavities, said third lens cavity being formed by a surface of revolution so as to define a tapered entrance and a smoothly rounded unpointed inner end portion, and being on the same side of said partial mirror as said first lens cavity, the axis of said third lens cavity being at the same angle with respect to said partial mirror as that of said axis of said first lens cavity, an extension of the axis of said third lens cavity intersecting said extension of said first and said second lens cavities at said partial mirror, a quantity of optical material of predetermined index of refraction in each of said lens cavities, means for emitting light in one of said lens cavities for being transmitted through said light-transmissive member with a portion of said light being transmitted through said partial mirror and a portion of said light being reflected by said partial mirror, and means for receiving light in the other two of said lens cavities.

6. A device as recited in claim 5 in which said light-transmissive member includes a fourth lens cavity formed by a surface of revolution so as to define a tapered entrance and a smoothly rounded unpointed inner end portion, said fourth lens cavity being opposite from and in axial alignment with said third lens cavity, the axes of said fourth and of said second lens cavities making equal angles with respect to said partial mirror, and including a quantity of optical material of predetermined index of refraction in said fourth lens cavity.

7. A device as recited in claim 6 in which said light-transmissive member is in two sections, said sections having flat abutting surfaces, said partial mirror being applied to one of said flat abutting surfaces.

8. An optical coupling device comprising
a light-transmissive member of predetermined index of refraction,
said light-transmissive member having first, second, third, and fourth lens cavities therein,
each of said lens cavities including a tapered entrance wall and a smoothly rounded unpointed inner end wall of predetermined contour formed by a surface of revolution, whereby said lens cavities are adapted to receive light-emitting and light-receiving means,
said first and said second lens cavities being opposite from each other with their axes in alignment,
said third and said fourth lens cavities being opposite from each other with their axes in alignment,
a partial mirror positioned between said first and said second lens cavities and between said third and said fourth lens cavities,
an extension of the axes of said first and said second cavities, and an extension of said axes of said third and said fourth cavities intersecting at said partial mirror,
said partial mirror being planar and at equal angles to said axes of said first, second, third, and fourth lens cavities,
said axes of said first, second, third, and fourth lens cavities falling in a single plane which is perpendicular to the plane of said partial mirror,
whereby light emitted by a light-emitting means in one of said lens cavities is transmitted through said light-transmissive member and to said partial mirror with a portion of said light being transmitted through said partial mirror to the one of said lens cavities opposite therefrom, and another portion of said light being reflected by said partial mirror and transmitted to another of said lens cavities, while the fourth of said lens cavities receives none of said light,
light-emitting and light-receiving means in at least some of said cavities, said light-emitting and light-receiving means including
a cylindrical optical fiber having a substantially flat end face perpendicular to the axis thereof received in at least one of said cavities, with the edge of said fiber between said end face and the cylindrical surface thereof engaging said tapered entrance wall so as to align said optical fiber with the axis and lens cavity receiving the same, and an optical material of predetermined index of refraction entirely filling the space between said end face and said inner end wall of said cavity receiving said optical fiber.

9. A device as recited in claim 8 including
a housing receiving said light-transmissive member, said housing having
an opening communicating with each of said lens cavities for providing access thereto,
and connecting means at each of said openings for connecting an optical device to said housing at each of said openings.

10. A device as recited in claim 9 in which each of said openings in said housing includes a tubular section, and said connecting means includes screw threads on said tubular sections.

11. A device as recited in claim 9 in which said light-transmissive member includes a tapered surface outwardly of each of said lens cavities for engagement by the tapered surface of such an optical device.

12. A device as recited in claim 9 in which said light-transmissive member is in two sections, said first and third lens cavities being in one of said sections, said second and fourth lens cavities being in the other of said sections, said sections having planar surfaces in juxtaposition with each other, said partial mirror being formed on one of said planar surfaces.

13. A light coupling device comprising
a light-transmissive member of predetermined index of refraction having a duality of lens cavities therein,
each of said lens cavities including a tapered entrance and a smoothly curved unpointed inner end wall of predetermined contour formed by a surface of revolution,
an optical fiber in each of said cavities,
each of said fibers having an end corner engaging the surface of the one of said cavities receiving the same for thereby centering the axis of each of said fibers with the axis of the one of said cavities receiving the same, an optical material of predetermined index of refraction in each of said cavities entirely filling the space between the end surface of the one of said fibers received therein and said end wall of said cavity, whereby said surfaces of revolution and said optical material form lenses, a plane partial mirror on said light-transmissive member, and a light detector adjacent said mirror on one side thereof, said cavities being on the opposite side of said mirror and spaced therefrom, extensions of the axes of said cavities intersecting at said mirror and making equal angles with respect thereto, whereby light emitted by one of said fibers is transmitted through said light-transmissive member to said mirror, a portion of said light being reflected by said mirror and transmitted by said light-transmissive member to the other of said cavities for being received by the other of said fibers, another portion of said light being transmitted through said mirror and received by said light detector.

* * * * *